Oct. 17, 1939.  J. G. AZAR  2,176,044
TRAP
Filed June 17, 1938

INVENTOR.
JOHN G. AZAR:
BY
*N. C. Carrillo*
ATTORNEY.

Patented Oct. 17, 1939

2,176,044

UNITED STATES PATENT OFFICE 2,176,044

TRAP

John G. Azar, San Francisco, Calif.

Application June 17, 1938, Serial No. 214,243

1 Claim. (Cl. 43—81)

The present invention relates to improvements in traps generally and has particular reference to a trap which embodies means for tripping the same comprising a novel trigger and a novel means for springing the trap.

The principal object of the invention is to provide a novel trap of this class that may be employed for catching or trapping animals or rodents of any sort and which embodies novel tripping means and means for springing the trap other than by the use of the usual springs commonly used in traps of this character.

Another object of the invention is to provide a trap of the character set forth that is of "Indian type" and that is extremely simple in character, is light in weight and that may be constructed solely of wood such as reed or like light wood.

A further object of the invention is to provide a simple and inexpensive trap of this character that employs a positive tripping means employing a twisted thong which causes the trap to be sprung without the use of the usual coil springs commonly used in traps of this type.

Additional to the foregoing objects is that of providing a trap of the character set forth that may be easily and readily handled, that may be easily transported from place to place and that may be easily set.

Other objects and advantages of the invention will be apparent with reference to the subjoined specification and the accompanying drawing in which—

Figure 1:
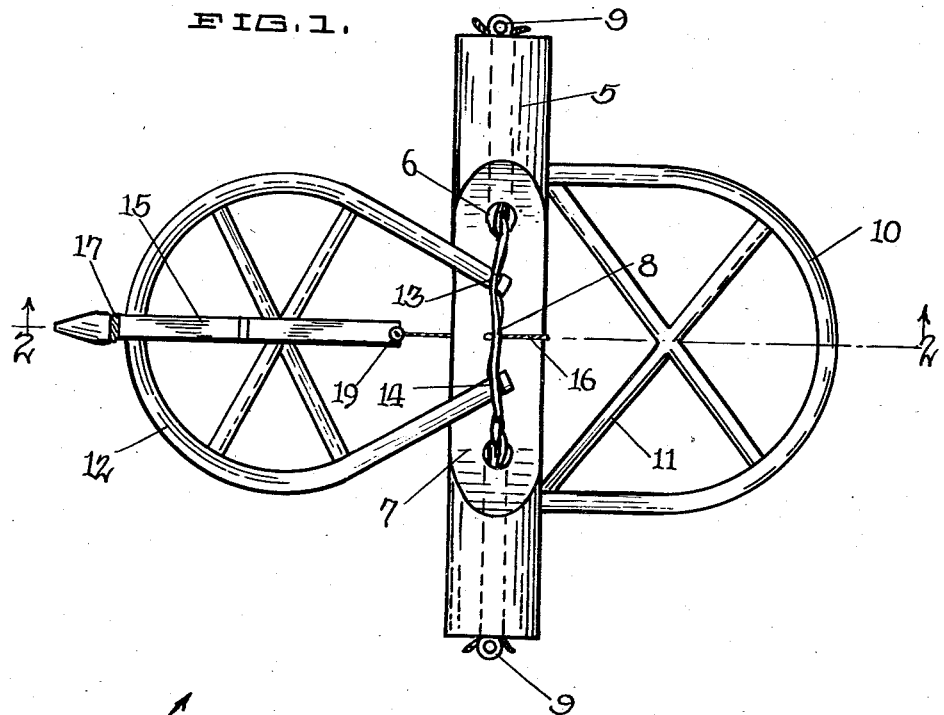
Figure 1 is a plan view of the improved trap showing the same in open position or set position.

It will be noted with reference to the drawing and especially to Figure 1 thereof that the improved trap consists of a centrally disposed curved cross piece 5 bored at 6 and hollowed out as indicated at 7 through which a twisted thong or gut 8 extends, said thong extending through the bore and having its ends held by means of small cleats 9, as clearly indicated in Figure 1.

The trap is preferably constructed of light wood such as reed and embodies a curved base section 10 braced as indicated at 11, the ends of which section are fixed in the cross member 5.

The trap section 12 is a looped section having its free notched ends 13 and 14 extending through the twisted thong 8, said looped section being held in set position by means of a trigger 15.

Bait is placed upon the trigger 15; and to prevent danger of accidental displacement I have provided a lug on said trigger, to which lug the bait is secured in any suitable manner. The said trigger 15, when the trap is set, is retained in set position by the novel arrangement of a cord 16 and an auxiliary cord 18, which are, respectively, connected to the ends of the trigger. As disclosed to advantage in Fig. 2, it will be noted that one end of the cord is first secured to the twisted thong 8, thereafter is trained under the trap section 12, and has its opposite end receivable in an annular recess 17 formed adjacent one end of the trigger 15. It will be noted that the auxiliary cord 18 extends upwardly from the cord 16 and in turn is positioned in a slot 20 formed in the end of the trigger 15 that is opposite to the recessed end 17. I have also provided on the cord 18 a stop 19 that is capable of holding the trigger 15 in set position when the said trigger normally rests over the looped section 12.

As the result of this construction when the trigger is properly set as described and when tripped by any animal or rodent the trap element 12 will be sprung thus gripping and securely holding the trapped animal or rodent between the elements 10 and 12 of the trap.

Figure 2:
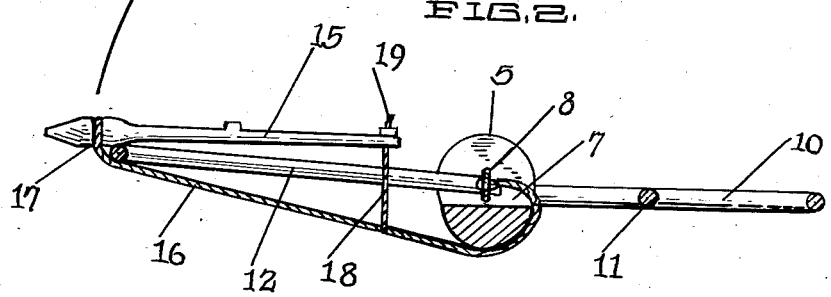
Figure 2 is a longitudinal sectional view of the trap as indicated by the line 2—2 in Figure 1.
Figure 3:
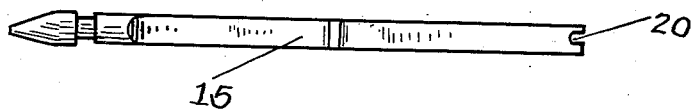
Figure 3 is a plan detail of the trigger of the device per se.

In the actual use of the device the trap section 12 is preferably placed adjacent a rock, or like obstruction, so that it will be necessary for the rodent, or other animal, to approach the right-hand side of the trap as it appears in Figs. 1 and 2.

It will thus be observed that I have provided a novel trap of simple construction and one that is exceptionally light in weight and that may be readily transported from place to place wherever it is desired to trap rodents or animals of any sort.

I claim and desire to secure by Letters Patent of the United States the following:

A trap of the class described embodying looped sections and a crosspiece having a twisted thong extending therethrough, a trigger mechanism cooperating with the thong and crosspiece to effect a tripping action, said mechanism including a bait holding trigger element having a notch in one end thereof and an annular recess adjacent the opposite end, said trigger being normally positioned over one of said looped sections, a cord connected at one end to the thong and having its opposite end receivable in the annular recess of the trigger element, and an auxiliary cord extending from said first-mentioned cord and equipped with a stop and receivable in the notch of the trigger element, the stop being capable of holding the trigger element in set position.

JOHN G. AZAR.